US009823085B2

(12) United States Patent
Kunath et al.

(10) Patent No.: US 9,823,085 B2
(45) Date of Patent: Nov. 21, 2017

(54) SYSTEM FOR CALCULATING ROUTES

(75) Inventors: Peter Kunath, München (DE); Alexey Pryakhin, München (DE); Markus Schupfner, München (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 522 days.

(21) Appl. No.: 13/402,296

(22) Filed: Feb. 22, 2012

(65) Prior Publication Data
US 2012/0232787 A1 Sep. 13, 2012

(30) Foreign Application Priority Data

Mar. 9, 2011 (EP) .................................... 11001955

(51) Int. Cl.
*G01C 21/00* (2006.01)
*G01C 21/34* (2006.01)
*G01C 21/36* (2006.01)
*G06T 17/05* (2011.01)

(52) U.S. Cl.
CPC ..... *G01C 21/3461* (2013.01); *G01C 21/3697* (2013.01); *G06T 17/05* (2013.01)

(58) Field of Classification Search
CPC .. G01C 21/3461; G01C 21/3697; G06T 17/05
See application file for complete search history.

(56) References Cited

U.S. PATENT DOCUMENTS

| 5,913,917 | A | 6/1999 | Murphy | |
|---|---|---|---|---|
| 6,173,231 | B1 | 1/2001 | Chojnacki | |
| 6,519,525 | B2* | 2/2003 | Namba | G01C 21/3679 340/988 |
| 2006/0212222 | A1* | 9/2006 | Miyoshi | B60K 31/0008 701/301 |
| 2007/0005237 | A1 | 1/2007 | Needham et al. | |
| 2008/0275643 | A1* | 11/2008 | Yaqub | G06Q 10/047 701/412 |
| 2009/0005961 | A1* | 1/2009 | Grabowski | G01C 21/365 701/532 |
| 2009/0282278 | A1* | 11/2009 | Satoh | G06F 1/3209 713/321 |
| 2010/0250581 | A1* | 9/2010 | Chau | G06F 17/30265 707/769 |
| 2010/0268461 | A1* | 10/2010 | Yu | G01C 21/3415 701/414 |

(Continued)

FOREIGN PATENT DOCUMENTS

WO WO 2006/036561 4/2006

OTHER PUBLICATIONS

European Search Report for European Application No. EP 11 0001 955.1 dated Nov. 21, 2011; 14 pages.

(Continued)

*Primary Examiner* — Adam Alharbi
(74) *Attorney, Agent, or Firm* — Artegis Law Group, LLP

(57) ABSTRACT

A navigation system determines one or more routes for a user from one location to another. The navigation system uses model data or information about weather, date, or time to determine an optimal route for a user. The navigation system may consider user preferences and dangerous or awkward conditions or criteria, and may perform a cost value analysis in determining the optimal route for a user.

27 Claims, 9 Drawing Sheets

(56) References Cited

U.S. PATENT DOCUMENTS

| | | | | |
|---|---|---|---|---|
| 2010/0286909 A1* | 11/2010 | Tate, Jr. | ............ | G01C 21/3446 701/533 |
| 2011/0054778 A1* | 3/2011 | Poiesz | ................ | G01C 21/3635 701/533 |
| 2011/0106436 A1* | 5/2011 | Bill | .................... | G01C 21/3407 701/467 |
| 2011/0118977 A1* | 5/2011 | Hixson | ............. | G01C 21/3644 701/533 |
| 2011/0194148 A1* | 8/2011 | Kobayashi | ........... | G06K 15/406 358/1.16 |
| 2011/0291881 A1* | 12/2011 | Shirai | .................... | G01S 19/22 342/357.25 |
| 2012/0185419 A1* | 7/2012 | Kuhn | ................ | H04M 1/72569 706/12 |
| 2012/0221247 A1* | 8/2012 | Aben | .................... | G01C 21/36 701/537 |
| 2013/0197797 A1* | 8/2013 | Boddy et al. | ................ | 701/424 |

OTHER PUBLICATIONS

Shen, "Research on GPS Reflected Signal Processing Technique and Applications", Department of Earth Sciences.

\* cited by examiner

SYSTEM FOR CALCULATING ROUTES

PRIORITY CLAIM

This application claims the benefit of priority from European Patent Application No. 11001955.1, filed Mar. 9, 2011, which is incorporated by reference.

BACKGROUND OF THE INVENTION

Technical Field

The present invention relates to systems and methods (generally referred to as "systems") for route calculation in a navigation device.

Related Art

Navigation systems may determine a route for guiding a user from one location to another location. For example, some navigation systems may guide a user to a parking place. However, some navigation systems may not factor in or consider user preferences or dangerous or awkward conditions when calculating a route. For example, some navigation systems may determine routes that present poor or adverse conditions, such as obstructed views or routes with adverse visibility. Therefore, a need exists for a navigation system configured to determine a route which considers user preferences and takes steps to avoid routes with difficult or awkward conditions.

SUMMARY

A navigation system is configured to determine one or more routes for a user from one location to another. The navigation system may use three-dimensional model data or information about weather, date, or time to determine an optimal route for a user. The navigation system may perform a cost value analysis in determining an optimal route for a user. The navigation system may consider and factor user preferences and dangerous or awkward conditions or criteria into the optimal route determination. Segments of a route which meet certain conditions or criteria may be weighted or valued differently than segments of a route which do not meet those conditions or criteria.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
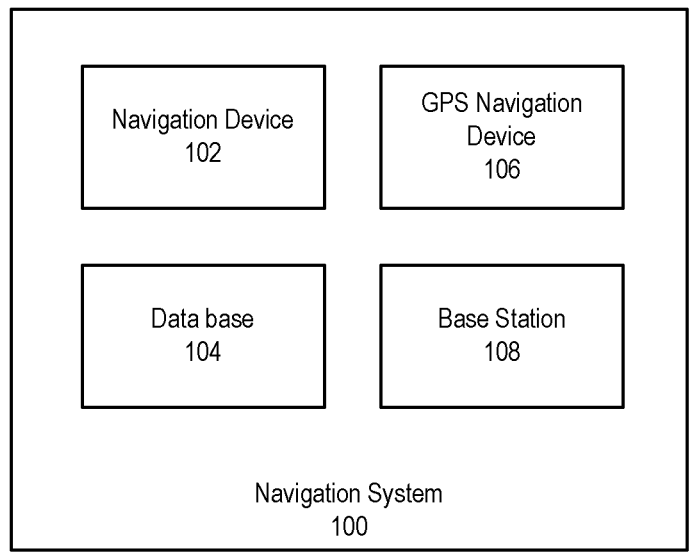
FIG. 1 is a block diagram of an example navigation system.

FIG. 1 is an example configuration of a navigation system 100 that may determine a route for a user. The navigation system 100 may receive a request from a user or device for a route between or passing through one or more locations. The navigation system 100 may calculate, generated, determine, or identify a route for a user based on one or more user preferences or dangerous or awkward conditions. A user of the navigation system 100 may be guided according to the determined route.

The navigation system 100 may include, for example, one or more navigation devices 102. The navigation device 102 may be or include a navigation device installed in a vehicle, a mobile navigation device, a mobile phone, a Personal Digital Assistant (PDA), a portable terminal, a home computer, or various other navigation devices.

The navigation system 100 may also or alternatively include one or more data base 104. The data base 104 may store various information and data, such as route information, map information, geographic information, environmental data such as three-dimensional environment model data, other model data, or various other information or data used by the navigation device 102 or navigation system 100. The database 104 may be located in or with the navigation device 102, or may be located separately or apart from the navigation device 102. For example, the base station and the navigation device 102 may communicate wirelessly with each other via a wireless network.

The navigation system 100 may also or alternatively include a Global Positioning System (GPS) navigation device 106. The GPS navigation device 106 may be configured or operable to acquire position data regarding a location a user of the navigation system 100 or user device. For example, the GPS navigation device 106 may be configured to determine where a user is on a road in a map database 104.

As an example, the GPS navigation device 106 may include or communicate with a receiving unit of the navigation system 100. The receiving unit of the navigation system 100 may receive signals, such as a signal from a satellite. The GPS navigation device 106 may determine the transit time of the received signal. The GPS navigation device 106 may implement or utilize one or more algorithms or functions and, based on the signal transit time, may determine the current position of the user of the navigation system 100. Additionally or alternatively, the GPS navigation device 106 may determine the current position of the user by determining or receiving information about an acceleration and velocity of the navigation device 102. The navigation device 102 may calculate a route from one location to another and guide a user accordingly by using one or both of the position data from the GPS navigation device 106 and data from the data base 104.

The navigation system 100 may also or alternatively include one or more base stations 108. For example, the navigation system 100 may be distributed such that the base station 108 may be located apart from the navigation device 102.

One or more of the navigation device 102, data base 104, GPS navigation device 106, and/or base station 108 may be physically connected or included together. Alternatively, one or more of the navigation device 102, data base 104, GPS navigation device 106, and/or base station 108 may be physically separate and located apart from other components. Where one or more of the navigation device 102, data base 104, GPS navigation device 106, and/or base station are physically separate and located apart from each other, the separate components may communicate with each other in various ways. For example, the separate components may communicate with each other over one or more wired or wireless network, such as via the Internet, or in various other ways. Additional or fewer components may be included in other navigation systems 100.

Figure 2:
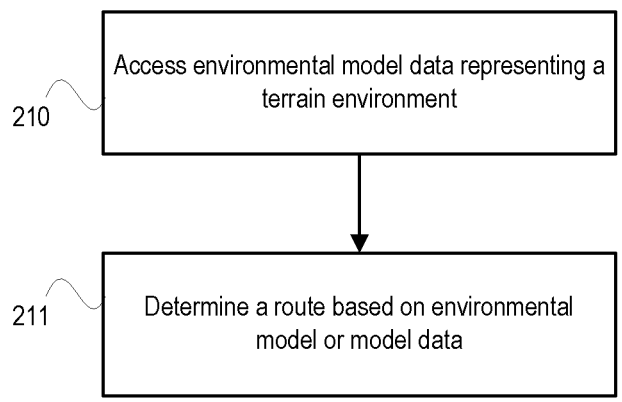
FIG. 2 is an example operational flow diagram of a navigation system.

FIG. 2 is a flow chart of an example method the navigation device 102, or navigation system 100, may perform to determine a route for a user. The method may begin in block 210, where the navigation device 102 or navigation system 100 may receive or access environmental model data. The environmental model data may be three-dimensional environmental model data representing a terrain environment. The three-dimensional environmental model data may include objects which may interact or impact with one or more road segments in various ways. The environment model data may be data which may be stored or received from the data base 104, base station 108, or another location or device.

Environmental model data may be or include data about a surface or terrain environment. A terrain environment may be defined as the surface of the earth and some or all objects thereon. A terrain environment may also or alternatively be a geographic region or a landscape, an urban area, a city, a village, an open space and a road space. The three-dimensional environmental model data may also be or include data or information about one or more objects on, or features of, the surface or terrain environment. For example, the three-dimensional environmental model data may include data about roads, streets, buildings, plants, vegetation, plantings, bridges, stairways, hills, mountains, rivers and shores, rivulets, lakes, and various other objects. The three-dimensional environmental model data may also or alternatively include data representing digital height information and terrain elevations such as, for example, mountains. Various other examples of three-dimensional environmental model data are possible.

Three-dimensional environmental model data about a terrain environment and objects may include information about elevations and heights of the terrain environment and objects. For example, the three-dimensional environmental model data may include information about a slope of the terrain environment, a height, width, length, and other dimensions of an object, information about a transparency or opaqueness of an object. The three-dimensional environmental model data may identify or provide information about how a road rises or falls or how a surface of the terrain or earth is contoured and changes in elevation. The three-dimensional environmental model data may identify or provide information about how high, wide, or close to a road segment one or more objects may be. The three-dimensional environmental model data may identify or provide information about an effect on a road segment from a height or proximity of a high, elevated, raised, overhanging, or otherwise impeding object. The three-dimensional environmental model data may provide various other information and data about a height or elevation of an object or road segment and an effect of the height or elevation of the object or road segment on a road segment or intersection or the safety of the road segment or intersection.

Elevations and heights of objects and terrain environments identified by three-dimensional environmental model data may affect or be used by the navigation device 102 to determine a route in various ways. A dimensionality of the objects and terrain environment may provide the navigation system with information about road segment conditions, such as exposure to wind, gradients or slopes of a road, potential damage during a storm, and other events. Adding information about a height to a two dimensional mapping system or road layout allows a navigation system to determine a safety and desirability of a road segment based on factors that are affected by elevation and surrounding height of objects. Such information may not be considered or used by a two dimensional mapping system.

The navigation device 102 may receive or access environmental model data in various ways, such as by accessing or receiving the model data from a data base 104 or a memory. Using the received environmental model data, the navigation device 102 or other component of the navigation system 100 may reproduce an environmental model, such as a three-dimensional environmental model (sometimes referred to as a three-dimensional model or digital three-dimensional model). The three-dimensional environmental model may be generated or reproduced using three-dimensional environmental model data. The three-dimensional environmental model may represent a part or all of the surface of the earth, and may include some or all the objects thereon. The three-dimensional model generated or reproduced by the navigation device 102 may be of the terrain environment. The three-dimensional environmental model may provide the navigation device 102 or other component of the navigation system 100 with three-dimensional information about, for example, height, position and dimension of buildings and trees along a street, a broadness of a street, and a slope of a street.

Objects identified in or by the three-dimensional model data may be reproduced as three-dimensional objects in the three-dimensional environmental model. The navigation device 102 may identify one or more three-dimensional environmental model objects which reside along a road or a street. For example, buildings and/or trees may cause a poor sight for directing a vehicle by a user of the navigation system. An object may be identified, for which the user of the navigation system searched, according to the three-dimensional information available in the three-dimensional environmental model object data. In some examples, the user of the navigation system 100 may be notified of one or more conditions or criteria associated with the object when a route is determined that includes the object, such as by providing a message which may contain a warning or information. Other variations and examples are possible.

In some navigation systems 100, the three-dimensional environmental model data may include digital terrain model data (DTM-data). DTM-data may be obtained or gathered through or by using remote sensing techniques or land surveying, and may be stored in a digital file. The navigation device 102 may generate a digital terrain model (DTM) from the DTM-data. The DTM may include one or more of a surface model and a digital elevation model. The DTM may include terrain elevations for ground positions at regularly spaced horizontal intervals. The DTM may provide a three-dimensional detailed representation of topographical variations of the earth's surface, elevation, and/or cultural features such as buildings and roads, and/or geographic features such as mountains or vegetation. The navigation device 102 or other component navigation system 100 may reproduce the three-dimensional model, such as the DTM, by processing x-, y-, and z-coordinate values of a surface.

The navigation device 102 or navigation system 100 may also or alternatively generate or reproduce a digital elevation model by computing raster data (such as raster points or pixels), vector data, a Triangulated Irregular Network (TIN), or in various other ways. Raster points may have one or more values such as height value or colour information. Vector data may include for example, information about coordinates, topology and spatial attributes. For a TIN, format raster data may be computed as a network of irregular triangles. Other examples are possible.

Figure 3:
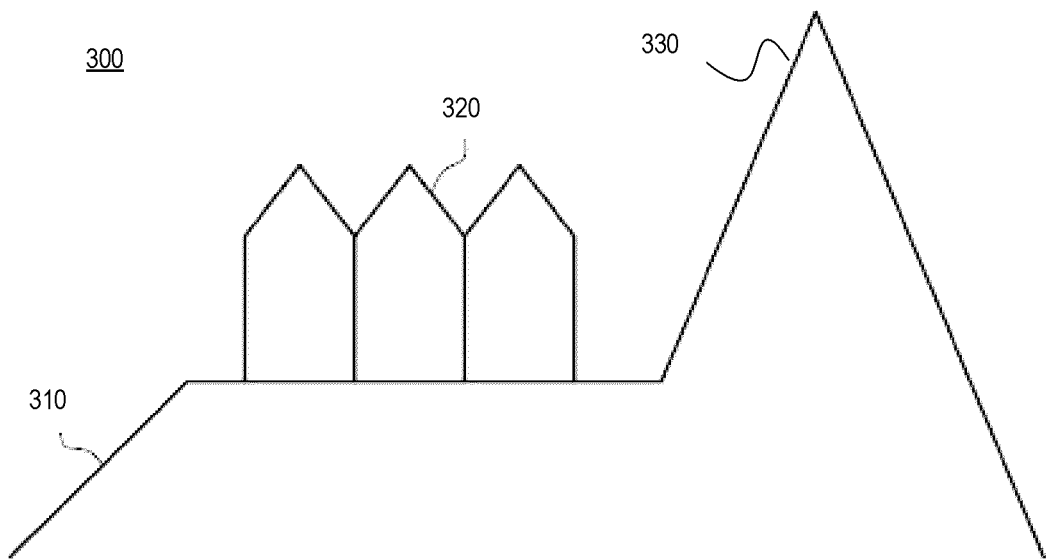
FIG. 3 is a diagram of a cross section of an example digital surface model.

FIG. 3 illustrates a cross section of one example of a three-dimensional surface model 300. The surface model 300 may include or show a surface 310. The three-dimensional surface model 300 may also or alternatively include or show one or more objects on the surface 310, such as houses 320. The three-dimensional surface model 300 may be based on the three-dimensional environmental model data, which may indicate or otherwise identify one or more features of the surface 310, houses 320, and one or more other geographic objects such as a mountain 330.

Figure 4:
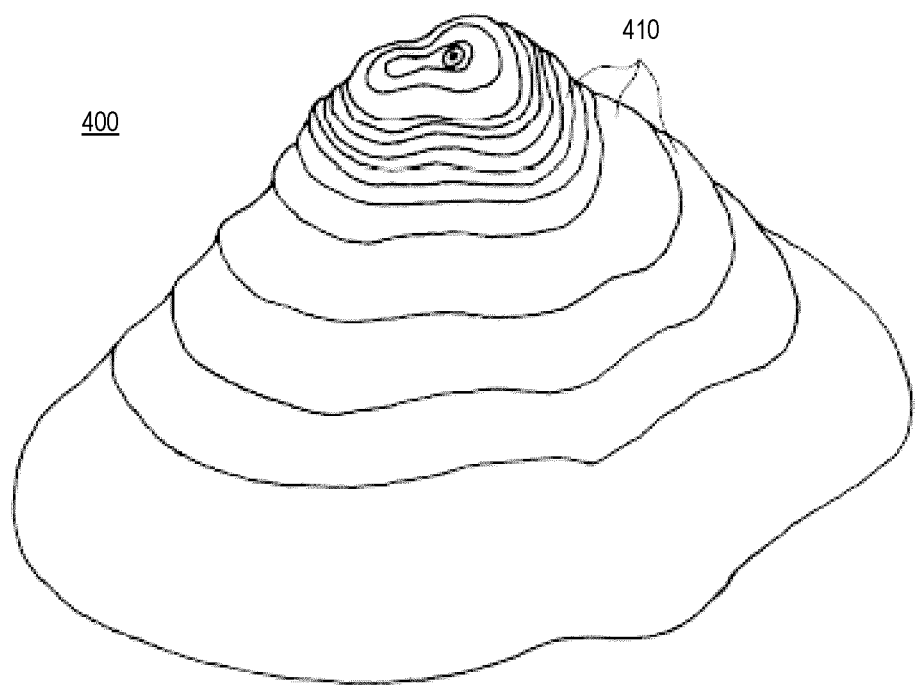
FIG. 4 is a diagram of an example digital elevation model.

FIG. 4 illustrates an example of a three-dimensional elevation model 400. The elevation model may be generated, created, or reproduced in various ways, such as by or using vector data. The elevation model 400 may include level curves 410 which may be used to show or illustrate a specific height. Various other three-dimensional environmental models may be generated or reproduced by the navigation device 102 or other components of the navigation system 100.

One or more of the three-dimensional environmental models, such as the surface model 300 or the elevation model 400, may be a dynamic model. A dynamic three-dimensional environmental model may be reproduced according to a zoom level. Different zoom levels may correspond to different resolutions of the three-dimensional environmental model data. For example, a three-dimensional environmental model with a high resolution may represent buildings and trees whereas a low resolution may represent hills and mountains. Other examples or variations are possible.

In block 211 of FIG. 2, the navigation device 102 or another component of the navigation system 100 may use one or both the three-dimensional environmental model data and three-dimensional model for determining, generating, identifying or otherwise calculating a route for a user. The navigation device 102 or navigation system 100 may determine or calculate a route from one position (such as a current position) to one or more other positions (such as a desired position) by, for example, using the three-dimensional environmental model data in or with a navigation algorithm. For example, the navigation device 102 may determine a route based on DTM-data in various ways, such as by using three-dimensional information from a DTM in the calculation of the route. The navigation device 102 or navigation system 100 may additionally or alternatively use two-dimensional geographic data in determining the route.

The navigation device 102 may consider, factor, assign values for, or otherwise calculate or determine a route based on various conditions or criteria. Conditions or criteria which may be considered by the navigation device 102 may include or correspond to an environmental parameter, such as a shadow, a weather condition, a number of points of interest, a slope of a road, a risk of flooding, a risk of a mudslide, and a risk of a snow slide, elevations in the environment, or various other conditions or criteria. The environmental parameter may be derived from the three-dimensional environmental model data.

The navigation device 102 may determine a route for a user from a first location to one or more other locations in various ways. The navigation device 102 may, for example, mathematically calculate the route by using three-dimensional information about the terrain environment in or with a navigation algorithm. The navigation device 102 may perform the calculation of an optimized route by or using a Dijkstra Algorithm, such as an A*-Algorithm. In some systems, the navigation device 102 may improve a runtime of the algorithm by combining known road segments in a major segment. The navigation device 102 may then consider the major segment in the algorithm or algorithms instead of performing a calculation with many known and smaller road segments.

The navigation device 102 may, for example, calculate or determine a route on, by, or using one or more cost functions and cost values. The cost functions and cost values may be chosen or depend on data of the three-dimensional environmental model or model data. The navigation device 102 may determine, calculate, generate, or assign a value for each segment or intersection of a possible route between two locations. For example, each road segment or intersection on a possible route between two locations may be assigned a value. The value assigned may be based on or consider one or more conditions or criteria, such as an estimated or average length of time to travel the road segment or intersection, a length of a road segment or intersection, and one or more other conditions or criteria which the navigation device 102 may consider at a request of a user or automatically. Examples of additional criteria or conditions may include shadows, a weather condition, a number of points of interest, a slope of a road, a risk of flooding, a risk of a mudslide, and a risk of a snow slide, elevations in the environment, limits for acceptable detours, differences in elevation along the route to be determined, or various other conditions or criteria. The navigation device 102 may then calculate a total value for each possible route between two locations by summing each of the weighted road segment and intersection cost values assigned in each possible route. The navigation device 102 may determine that a route with the highest (or lowest) value may be the best route, and may output this route to a user. The determination of the route may be performed based on maximizing or minimizing of one or more cost functions corresponding to the selected criteria, and/or on criteria provided with different weights. In particular, the route may be determined such that a cost function corresponding to a criterion is maximized or minimized. Different criteria or conditions may be weighted differently or may be weighted the same. One or more of the conditions or criteria may be automatically, programmatically, or otherwise set to be considered or determined by the navigation device 102.

In other examples, the navigation device 102 or navigation system 100 may be configured or operable to receive an input from a user of the navigation system 100 identifying one or more conditions or criteria to be considered by the navigation device 102 in generating, determining, identifying, or otherwise calculating a route. A user may specify preferences or cost values for use by the navigation device 102. The user may select which conditions or criteria may contribute to the calculation. The user may prioritize particular criteria such that high-priority criteria may contribute more to the calculation of the route than the low-priority criteria. As an example, a user may indicate a top preference for a shady route, and a secondary preference for a route through mountains. In this example, road segments that the navigation device 102 determines are shady may be assigned a first additional value for this preference, and road segments that the navigation device 102 determines are mountains may be assigned a second additional value for this preference. The first additional value for the shady road segments may be greater than the second additional value for the mountain road segments, indicating a greater importance or weight of the shady road segments. These criteria may contribute to the calculation of the route by different percentages. Other examples are possible.

In maximizing the cost, conditions or criteria which are not selected or used by the navigation device 102 may not contribute to the cost value analysis. For example, in some systems, a user may input a preference for a shady route, and may indicate that arrival time is not a factor. In this example, the navigation device 102 may assign values to shady road segments or intersections, and may not assign any value for longer or shorter expected travel times. The navigation device 102 may compute values for possible routes, and may select the route with the greatest value, which may correspond to the shadiest route, irrespective of a travel time. Other variations or examples are possible.

In maximizing the cost function, one or more other conditions might have to be satisfied. For example, a user may specify that no route should travel between two large buildings. The navigation device 102 may accomplish this in various ways. For example, the navigation device 102 may assign a very high or infinite additional value (or a low or infinitely negative value) for any road segments between two large buildings, such that any possible route including this segment will have a total cost value that is prohibitively high or low, and will not be selected as the best route by the navigation device 102. In other systems, the navigation device 102 may flag or remove any road segment between two large buildings, such that no possible route may include such a road segment. Other variations may be implemented.

As an example of a route calculation using a condition or criteria, the navigation device 102 or other component of the navigation system 100 may use height information from the three-dimensional environmental model data (such as the elevation model 400) for identifying slopes of a road or a street. The height information may be used by the navigation device 102 in various ways, such as for avoiding dangerous slope and elevation conditions, or conforming with other conditions or criteria related to height. The navigation device 102 or navigation system 100 may, for example, perform a navigation algorithm to factor for or avoid a calculated route on a road or a street having an extreme slope.

For example, a user may input or otherwise select, with the navigation device 102 or navigation system 100, a preference to expeditiously arrive at a destination, while avoiding road segments with large differences in elevation. In another example, a driver of a car may input or otherwise select a preference for avoiding a route through a mountain range in order to save power and to preserve the engine of the car. In these or other examples, the navigation device 102 may determine or calculate the difference of elevation for each road segment. The navigation device 102 may assign or add an (additional) cost value for road segments with differences in elevation. The additional value may be based on an algorithm or may otherwise be proportional to the difference in elevation of the road segment to each road segment. The navigation device 102 may then calculate the route based on a total cost value determined by summarizing the cost value of the respective travel time and the additional cost value being proportional to the difference in elevation.

In another example, a user driving a motorcycle may input or otherwise select a preference that a route be calculated that guides through a mountain range and includes as many serpentine turns as possible. In this example, the navigation device 102 may assign or add (additional) cost value to each road segment which is flat, does not go through a mountain range, or include turns, and may then calculate the total route. Other variations or examples are possible.

By using the three-dimensional information about a terrain environment provided by the three-dimensional environmental model data, the navigation device 102 may determine an optimized route avoiding undesired, dangerous, or awkward conditions for a user resulting for example from large differences in elevation at different road segments. This may be advantageous for various users such as truck or camper drivers in a mountainous region, and may provide an enhanced safety for the user and vehicle.

As another example of a route calculation using a condition or criteria, the navigation device 102 or other component of the navigation system 100 may use object information from the three-dimensional environmental model data for identifying preferred, dangerous, or awkward conditions regarding objects and line or sight. Three-dimensional environmental model data may include data representing at least one three-dimensional environmental model object, such as one of a street, a road, a building, vegetation, a plant, a planting, a hill and a mountain of the terrain environment. The three-dimensional environmental model object may be represented by the three-dimensional environmental model object data. The navigation device 102 or navigation system 100 may calculate, determine, or generate a route based on the at least one three-dimensional environmental model object data. The navigation device 102 or navigation system 100 may perform a navigation algorithm, for example, to factor for or avoid a calculated route on a road or a street having obstructions.

For example, the navigation device 102 may, as programmed or determined by a user preference, consider conditions created or resulting from objects, such as conditions where a view is obstructed or offers a user a poor line of sight. For each road segment or intersection of a possible route, the navigation device 102 or other component of the navigation system 100 may identify or determine, based on the three-dimensional environmental model data, road segments or intersections that obstruct a view due to one or more objects, such as vegetation or buildings, narrow streets, or other locations with poor sight. The navigation device 102 may assign an additional cost value to such intersections or sections of road with objects or obstructions causing poor sight and may consider this in evaluating a cost function. In at least this way, the navigation device 102 or navigation system 100 may increase the safety of the user of the navigation system 100.

Information about weather, date, and time may be considered by the navigation device 102 in generating or calculating a route according to one or more conditions or criteria. The navigation device 102 may receive, access, provide and/or output information or data about one or more of the weather, date and time.

The navigation device 102 may use information about weather, date, and time to calculate or generate a route that avoids certain weather systems, such as a storm. For example, the navigation device 102 may assign additional cost value to road segments or portions of a route which may travel through an upcoming storm, or may avoid such road segments altogether. As another example, the navigation device 102 may identify or determine road segments and/or intersections which are protected against a gust of wind due to buildings, mountains or hills based on the three-dimensional environmental model data. The navigation device 102 may also or alternatively identify or determine road segments and/or intersections which are not protected against a gust of wind. When calculating the route, the navigation device 102 may assign an additional cost value to such road segments and/or intersections which are not protected against wind, and/or may reduce or deduct a cost value from those road segments or intersections which are protected against the wind. By considering the additional cost values in evaluating the cost function, the navigation device 102 may enhance the safety of the user of the navigation system.

Figure 5:
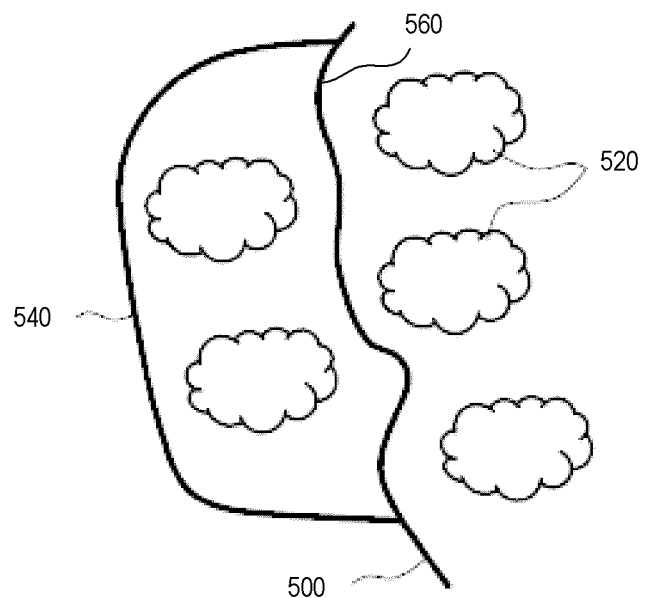
FIG. 5 is a diagram of example routes determined by a navigation system.

FIG. 5 shows a route 500 determined, generated, calculated, or otherwise identified by the navigation device 102. The route 500 using the road segment 560 represents a route that may be calculated without information data about weather, date and time. The road segment 560 travels directly through the storm and stormy clouds 520. The route 500 using the road segment 540 instead represents a route that may be calculated circumnavigating the storm and stormy clouds 520. Route 500 using the road segment 540 may be calculated by including information data about weather, date and time in the navigation algorithm, and by assigning a favourable value for the favourable road segment 540 or assigning a bad or negative value for the unfavourable road segment 560.

By considering weather information about a storm (represented by stormy clouds 520) arising in a geographical region where a route would guide through, the navigation device 102 may determine an alternative route with road segment 540 by avoiding the road section 560 through the region which is affected by the storm, avoiding an upcoming storm and guiding the user around the stormy area. Calculating the route based on the three-dimensional environmental model data and the information data about weather, date and time may lead to a determined route which guides a user of the navigation system 100 along an alternative route in case when a conventionally defined route would lead through an area with a higher risk of being flooded due to rainfall or snow water near a lake, a river or a rivulet.

As another example of determining a route based on one or more conditions or criteria, the navigation device 102 may estimate a direction of a water stream flow in the terrain environment. For example, the navigation device 102 may use one or more of DTM-data and information data about weather, date and time to estimate a direction of a water stream flow, and/or perform watershed delineation. The navigation device 102 may use the determined estimated direction of the water stream flow in the terrain environment to determine or calculate a safe route for a user.

For example, the navigation device 102 may determine that water may, for example, be one of running rain water, running snow water, water flowing down a hill, overflowing water from a river, a rivulet, a creek, a lake, or other water. The navigation device 102 may also or alternatively perform watershed delineation when calculating the route. A DTM accessible or generated by the navigation device 102 may contain elevation data and height information of the terrain environment. The navigation device 102 may determine or calculate that the direction of a water stream flow may, for example, be from a higher location to a lower location in the terrain environment represented by the DTM (based on the three-dimensional DTM-data). Based on these calculations or determinations, the navigation device 102 may identify, for example, a location or area in the terrain environment where the risk of flooding is low or high. As another example, the navigation device 102 may utilize a calculation or determination of a direction of water flow on a road with other weather information, such as temperature, to identify road segments or intersections where ice may form on the surface of the road. Cost values may be assigned to road segments or intersections where water flow or other dangerous water conditions may be identified by the navigation device 102. By determining and considering risks of icing and flooding in route calculation, the navigation system 100 and navigation device 102 may enhance the safety of users.

As another example of determining a route based on one or more conditions or criteria, the navigation device 102 may determine a position of a shadow of a three-dimensional environmental model object based on the three-dimensional environmental model data and/or the information data about weather, date and time. Shadows may be made by various objects, such as, for example, a tree, a building or a mountain. The position of the shadow may include, for example, information about one or more of a direction, length and latitude of the shadow of the three-dimensional environmental model object. The navigation device 102 may meter time by a solar clock. The solar clock may show any time, such as, for example, "winter time" or 36 minutes less than Central European Time, or various other times. The navigation device 102 may calculate or determine the change of the position of the shadow from day to day at the same time, such as through or using an equation of time and the horizontal angle of the shadow, by using information from a lookup table or accessible to the navigation device 102, or in various other ways. The navigation device 102 may use weather information in calculating or determining a position of a shadow. For example, where the weather information indicates a cloudy or overcast day, the navigation device 102 may reduce the significance of a predicted shadow. Other examples are possible.

The navigation device 102 may calculate or determine a route based on the determined position of the shadow of the three-dimensional environmental model object represented by the three-dimensional environmental model object data. For example, the navigation device 102 may determine a route which guides a user on a road where a shadow is maximised, such as through an avenue or near the mountain, or where a shadow is minimized, such as through an open or unobstructed area like a field.

As an example, a user may indicate a preference or specify a criterion to expeditiously arrive at a destination, while avoiding sunny road segments. The driver or a passenger may wish to avoid a condition of heat inside a vehicle, which may stress the driver, and as such may input or otherwise select a preference for a shady route. In such a case, the navigation device 102 may calculate or determine a shadow area or value for each road segment and each intersection. The shadow area or value may be determined for each time based on the three-dimensional environmental model data. The navigation device 102 may assign an additional cost value being proportional to the sunny area of the road segment or the intersection, respectively, at each time. The navigation device 102 may then calculate the route based on a total cost value for each combination of road segments and intersections, determined by summarizing the cost value of the respective travel time and the additional cost value being proportional to the shadow area. Where the user prefers avoiding sunny road segments and/or intersections without taking into account the resulting travel time, the respective sunny area may be defined as a cost value alone. In this example, the navigation device 102 may generate a route where heat inside a vehicle is reduced without operating an air condition, and a user is directed to a destination without being blinded by the sun. The route generated by the navigation device 102 may additionally save fuel due to avoidance of extensive use of the air condition, increase power consumption, decrease a humidity of air inside a vehicle, and enhance a user safety. The navigation device 102 may generate or calculate a route along which the shadow is maximized which can be realized inter alia due to the consideration of the three-dimensional environmental model data. In this example, shadow may be the selected criterion and the cost function can be shadow intensity per meter (or various other measurements) of the route.

The navigation device 102 or other components of a navigation system 100 may access or receive information from Traffic Message Channel (TMC) and/or Transport Protocol Experts Group (TPEG). The navigation device 102 or other component of the navigation system 100 may determine a route for a user based on the information from TMC and/or TPEG. For example, where the navigation system 100 receives information from a TMC or TPEG that an accident has occurred at a road segment or intersection, the navigation system 100 may assign an additional cost value to the road segment or intersection, or may avoid the road segment or intersection completely, in calculating or otherwise determining a route. Other examples are possible.

Figure 6:
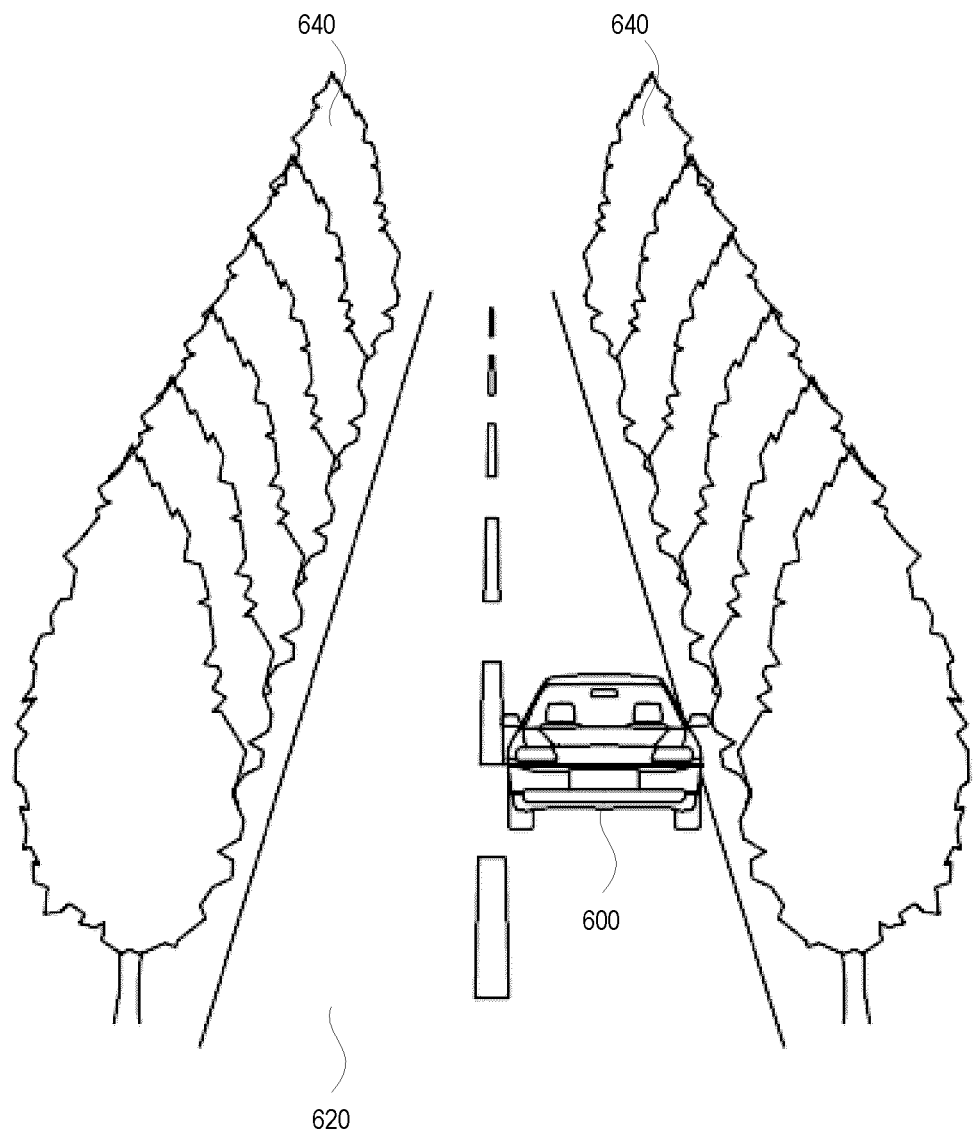
FIG. 6 is a diagram of an example car in a road segment surrounded by objects.

One or more road segments or intersections may present various conditions which may be favourable or desired, unfavourable or not desired, or both. For example, For example, FIG. 6 illustrates a car 600 driven by a user of the navigation system 100 through an avenue or road segment 620. Trees 640 along the road segment 620 may offer shadows. Information data about weather, date and time may be provided and included when calculating the route by the navigation algorithm. Where the navigation device 102 determines the shadows are beneficial, such as where the user has indicated a preference for a shady drive, the road segment 620 may be assigned an additional value. However, the same trees 640 may have leaves and branches which may present problems in a storm with high winds, such as where branches break and fall onto the road segment 620 or leaves are blown at or into car windshields. Where the navigation device 102 determines the trees 640 are not beneficial, such as where a storm is pending, no cost value (or a low or negative cost value) may be added to the road segment 620. Other examples are possible.

In some systems, the navigation device 102 may determine a location as a place for parking based on at least one of the three-dimensional environmental model data, DTM-data, information data about weather, date and time, and information from TMC and/or TPEG. The navigation device 102 may display, alert, or indicate the determined location as the parking place to the user of the navigation system 100.

For example, a user may input or otherwise select a preference to be directed to a shady parking place for a vehicle such that the parked vehicle is not heated by the sun. The navigation device 102 may determine or identify parking locations which have a shadow, such as with the three-dimensional environmental model or model data and the information about weather, date, and time, and may direct the user to that location. As another example, the navigation device 102 may identify or determine that the user may be heading for a storm.

Figure 7:
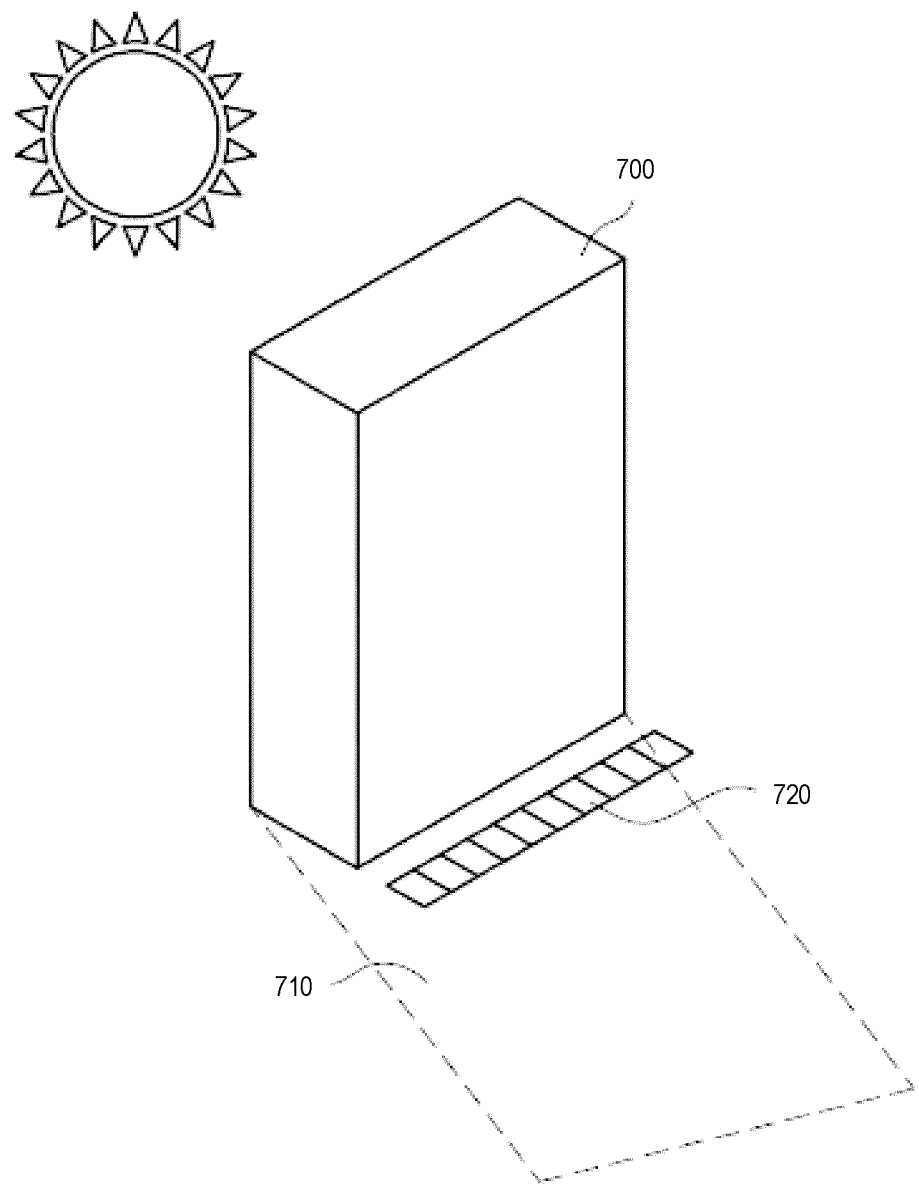
FIG. 7 is a diagram of an example image of a building offering shadow to a parking place.

As an example, FIG. 7 illustrates a building 700 offering shadow 710 for a parking place 720. The navigation device 102 may consider, as a condition or criteria in determining a parking place, a minimization of heat. The position of the shadow may be calculated based on the three-dimensional environmental model data while considering date and time. The navigation device 102 may determine, based on the analysis, that parking space 720 may be in a shady or shadowed location and may minimize heat while parked.

The navigation device 102 may use weather information to identify or determine a parking location away from a tree to avoid a risk of falling branches. As another example, the navigation device 102 may identify and avoid parking locations where the risk of flooding is high. The weather conditions and their influence on environmental factors such as, for example, the position of a shadow, may be prognosticated. The navigation device 102 may, in this additional way, enhance safety of the user of the navigation system and the vehicle.

Figure 8:
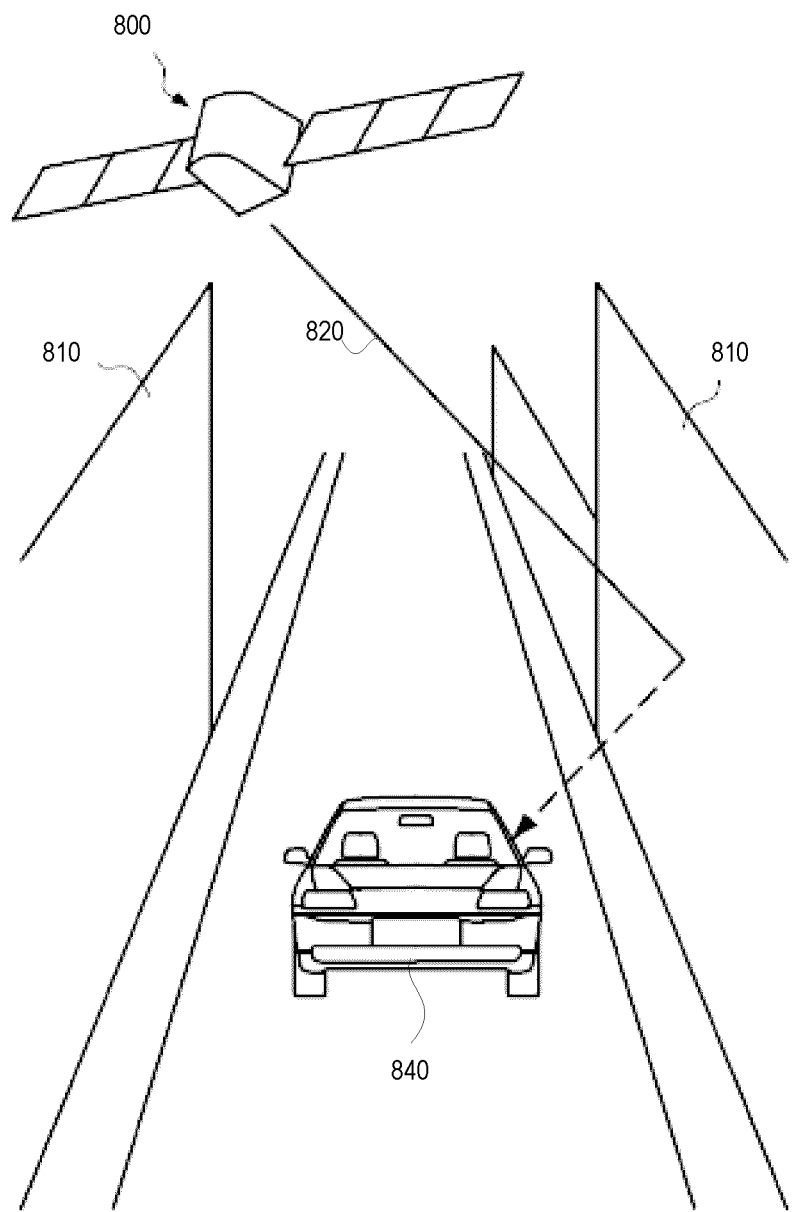
FIG. 8 is a diagram of an example circumstance for generating a reflection model.

The three-dimensional environmental model data may include a reflection model representing reflections of GPS signals by one or more three-dimensional environmental model object. For example, FIG. 8 illustrates a satellite 800 sending a signal 820 to a car 840. Objects or obstructions, like plants and buildings 810, may prevent signals 820 from GPS satellites 800 from being received by the navigation system 100.

The navigation device 102 may derive or generate a reflection model representing the terrain environment from the three-dimensional environmental model data. The reflection model may represent the reflection by the objects. The navigation device 102 may deduce or identify the reflection model from the three-dimensional environmental model data. The navigation device 102 may determine a current position of a user of the navigation system 100 based on the reflection model and GPS information. For example, the navigation device 102 may adjust or correct a position calculated based on the received GPS signal 820 by the data reproducing the reflection model, allowing the navigation device 102 to determine more precisely the current position of the user of the navigation system 100. The reflection model may be used to correct the determination of the GPS-position of a user of the navigation system. Other examples are possible.

In some systems, the navigation device 102 may provide a message to a user of the navigation system based on an identified three-dimensional environmental model object, condition, or criteria. The navigation device 102 may send a message, for example, where the navigation device 102 has generated or calculated a route which may include or present obstructions (such as vegetation or buildings) that may cause a poor sight on the road such that the user of the navigation system may be required to be highly careful when passing another road user or turning to another direction. Such routes may be generated in various instances, such as where the determined route is has a better (lower) cost value than some or all other routes, or when the calculated route has been specified as preferred by the user. When such a route with obstructions or dangers is determined, the navigation device 102 may provide a warning to the user.

The navigation device 102 may present the warning when the route is first presented, when or near when the obstruction will be encountered by the user of the navigation system 100, or at various other times. The warning may be presented in the form of a voice message, textual message, video message, or in various other ways. The message may alert the user to the obstruction or dangerous condition, and/or may include instructions for navigating the obstruction or dangerous condition. For example, the message may include a warning relating to a frozen surface, and/or include an instruction to be cautious and drive slowly. As another example, the message may include a warning related to leaves and branches or other debris on the road. As another example, in an open landscape, the message may include a warning which relates to a gust of wind and/or may include an instruction to maintain a firm grasp on the wheel. Providing a warning message and/or instructions may be useful in that the user of the navigation system may be careful, for example, in the form of reducing the vehicle's speed. Warning messages may also or alternatively enhance the safety of a user of the navigation system.

Figure 9:
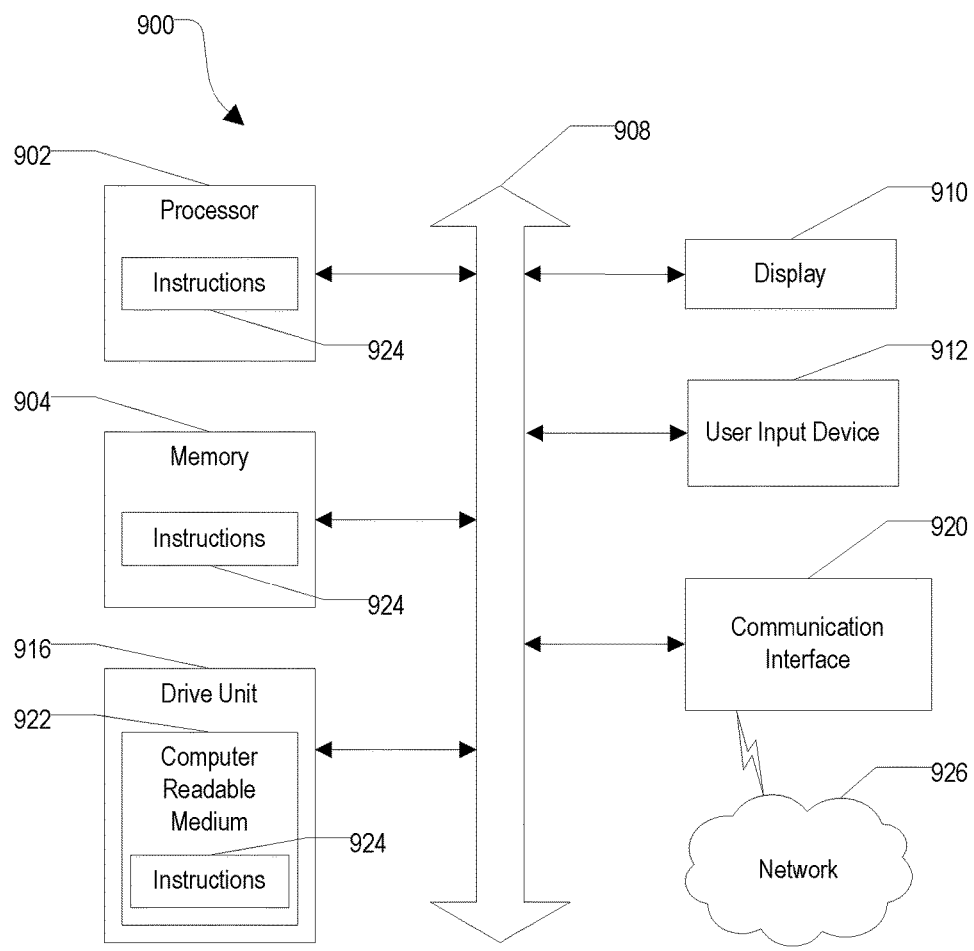
FIG. 9 is a block diagram of an example computer system that may be included or used with a component of the navigation system.

One or more of the navigation device 102, data base 104, GPS navigation device 106, base station 108, or other component of the navigation system 100 may be or may include a portion or all of one or more computing devices of various kinds, such as the computer system 900 in FIG. 9. The computer system 900 may include a set of instructions that can be executed to cause the computer system 900 to perform any one or more of the methods or computer based functions disclosed. The computer system 900 may operate as a standalone device or may be connected, e.g., using a network, to other computer systems or peripheral devices.

In a networked deployment, the computer system 900 may operate in the capacity of a server or as a client user computer in a server-client user network environment, as a peer computer system in a peer-to-peer (or distributed) network environment, or in various other ways. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. The computer system 900 may be implemented using electronic devices that provide voice, audio, video or data communication. While a single computer system 900 is illustrated, the term "system" may include any collection of systems or sub-systems that individually or jointly execute a set, or multiple sets, of instructions to perform one or more computer functions.

The computer system 900 may include a processor 902, such as a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually or programmed.

The term "module" may be defined to include a number of executable modules. The modules may include software, hardware or some combination thereof executable by a processor, such as processor 902. Software modules may include instructions stored in memory, such as memory 904, or another memory device, that may be executable by the processor 902 or other processor. Hardware modules may include various devices, components, circuits, gates, circuit boards, and the like that are executable, directed, and/or controlled for performance by the processor 902.

The computer system 900 may include a memory 904, such as a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 904 includes a cache or random access memory for the processor 902. In alternative examples, the memory 904 may be separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described may be performed by the programmed processor 902 executing the instructions stored in the memory 904. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 900 may or may not further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

The computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900. A user of the navigation system 100 may, for example, input criteria or conditions to be considered by the navigation device 102 in calculating a route using the input device 912.

The computer system 900 may include a disk or optical drive unit 916. The disk drive unit 916 may include a computer-readable medium 922 in which one or more sets of instructions 924 or software can be embedded. The instructions 924 may embody one or more of the methods or logic described. The instructions 924 may reside completely, or partially, within the memory 904 and/or within the processor 902 during execution by the computer system 900. The memory 904 and the processor 902 also may include computer-readable media as discussed above.

The computer system 900 may include computer-readable medium that includes instructions 924 or receives and executes instructions 924 responsive to a propagated signal so that a device connected to a network 926 can communicate voice, video, audio, images or any other data over the network 926. The instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed later. The additional connections with other components of the system 900 may be physical connections or may be established wirelessly. The network 926 may alternatively be directly connected to the bus 908.

The network 926 may include wired networks, wireless networks, Ethernet AVB networks, or combinations thereof. The wireless network may be a cellular telephone network, an 802.11, 802.16, 802.20, 802.1Q or WiMax network. Further, the network 926 may be a public network, such as the Internet, a private network, such as an intranet, or combinations thereof, and may utilize a variety of networking protocols now available or later developed including, but not limited to TCP/IP based networking protocols. One or more components of the navigation system 100 may communicate with each other by or through the network 926.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 900 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system 900 encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for calculating a route in a navigation system, the method comprising:
   receiving one or more user preferred physical properties for a three-dimensional terrain of the route for mathematically calculating the route;
   assigning, via a processor, a value to each of one or more road segments based on whether one or more physical properties of each of the one or more road segments meet the one or more user preferred physical properties of the three-dimensional terrain, thereby generating one or more weighted road segments, wherein the one or more physical properties of each of the one or more road segments are defined by three-dimensional environmental model data that represents a three-dimensional terrain of each of the one or more road segments; and calculating the route from a plurality of possible routes based on the values corresponding to the one or more weighted road segments.

2. The method of claim 1, where the three-dimensional environmental model data comprises data representing at least one three-dimensional environmental model object representing one of a street, a road, a building, a vegetation, a plant, a planting, a hill or a mountain of the terrain environment; and where calculating the route comprises calculating the route based on the at least one three-dimensional environmental model object data.

3. The method of claim 2, further comprising:

identifying a three-dimensional environmental model object represented by the three-dimensional environmental model object data at a section of the calculated route based on the three-dimensional environmental model data; and providing a message to a user of the navigation system referring to the identified three-dimensional environmental model object.

4. The method of claim 1, further comprising providing information data about at least one of weather, date or time; and where calculating the route comprises calculating the route based on the information data about at least one of weather, date or time.

5. The method of claim 4, where the three-dimensional environmental model data comprises a digital terrain model data;

where the method further comprises estimating a direction of a water stream flow in the terrain environment based on the digital terrain model data and the information data about at least one of weather, date or time; and where calculating the route comprises calculating the route based on the estimated direction of the water stream flow in the terrain environment.

6. The method of claim 4 further comprising determining a position of a shadow of a three-dimensional environmental model object based on the three-dimensional environmental model data and the information data about weather, date and time; and where calculating the route comprises calculating the route based on the determined position of the shadow of the three-dimensional environmental model object represented by three-dimensional environmental model object data.

7. The method of claim 1 further comprising providing information from a Traffic Message Channel or a Transport Protocol Experts Group; and where calculating the route comprises calculating the route based on the information from the Traffic Message Channel or the Transport Protocol Experts Group.

8. The method of claim 1 further comprising:

determining a location as a place for parking based on at least one of the three-dimensional environmental model data, digital terrain model data, information data about weather, date and time, or information from a Traffic Message Channel or a Transport Protocol Experts Group; and indicating the determined location as the parking place to a user of the navigation system.

9. The method of claim 2, where the three-dimensional environmental model data comprises a reflection model representing the reflections of Global Positioning System signals by the three-dimensional environmental model object, and where the method further comprises determining a current position of a user of the navigation system based on the reflection model and the Global Positioning System signals.

10. The method of claim 1, where the one or more user preferred physical properties comprise at least one three-dimensional environmental terrain parameter.

11. The method of claim 1, where the one or more user preferred physical properties comprise at least one of a shadow, a slope of a road, an elevation of a road, and a height of an object proximate to a road segment.

12. The method of claim 1, where the route is calculated by means of one or more cost functions and cost values depending on the three-dimensional environmental model data and the one or more user preferred physical properties comprising at least one three-dimensional environmental terrain parameter by:

determining, for each route included in the plurality of possible routes, a cost value for each weighted road segment included in the route; and adding, for each route included in the plurality of possible routes, the cost values for the weighted road segments included in the route.

13. The method of claim 1 further comprising guiding a user of the navigation system according to the calculated route.

14. A navigation system for calculating a route, comprising:

a database storing three-dimensional environmental model data that represents a three-dimensional terrain environment; and a navigation device configured to:

receive one or more user preferred physical properties for a three-dimensional terrain of the route for mathematically calculating the route;

assign, via a processor, a value to each of one or more road segments based on whether one or more physical properties of each of the one or more road segments meet the one or more user preferred physical properties of the three-dimensional terrain, thereby generating one or more weighted road segments, wherein the one or more physical properties of each of the one or more road segments are defined by three-dimensional environmental model data that represents a three-dimensional terrain of each of the one or more road segments; and calculate the route from a plurality of possible routes based on the values corresponding to the one or more weighted road segments.

15. The navigation system of claim 14, where the navigation device comprises one of a mobile navigation device, a navigation device installed in a vehicle, a mobile phone, a Personal Digital Assistant, PDA, and a portable terminal.

16. The navigation system of claim 14, further comprising a Global Positioning System navigation device configured to acquire position data regarding a location of a user of the navigation system.

17. The navigation system of claim 14, further comprising an input device configured to receive the user preferred physical properties.

18. The navigation system of claim 17, where the navigation device is configured to calculate the route based on the three-dimensional environmental model data and the user preferred physical properties.

19. The navigation system of claim 14, where the one or more user preferred physical properties comprise at least one of a shadow, a slope of a road, an elevation of a road, and a height of an object proximate to a road segment.

20. A non-transitory computer readable storage medium having stored therein data representing instructions executable by a processor for calculating a route, the storage medium comprising:
   instructions to receive one or more user preferred physical properties for a three-dimensional terrain of the route for mathematically calculating the route;
   instructions to assign, via the processor, a value to each of one or more road segments based on whether one or more physical properties of each of the one or more road segments meet the one or more user preferred physical properties of the three-dimensional terrain, thereby generating one or more weighted road segments, wherein the one or more physical properties of each of the one or more road segments are defined by three-dimensional environmental model data that represents a three-dimensional terrain of each of the one or more road segments; and
   instructions to calculate the route from a plurality of possible routes based on the values corresponding to the one or more weighted road segments.

21. The storage medium of claim 20, where the three-dimensional environmental model data comprises data representing at least one three-dimensional environmental model object representing one of a street, a road, a building, a vegetation, a plant, a planting, a hill or a mountain of the terrain environment; and
   where the instructions to calculate the route comprise instructions to calculate the route based on the at least one three-dimensional environmental model object data.

22. The storage medium of claim 21, further comprising:
   instructions to identify a three-dimensional environmental model object represented by the three-dimensional environmental model object data at a section of the calculated route based on the three-dimensional environmental model data; and
   instructions to provide a message to a user of the navigation system referring to the identified three-dimensional environmental model object.

23. The storage medium of claim 20, further comprising instructions to provide information data about at least one of weather, date or time; and
   where the instructions to calculate the route comprise instructions to calculate the route based on the information data about weather, date and time.

24. The storage medium of claim 20, wherein calculating the route comprises evaluating each possible route based on the three-dimensional environmental model data and the one or more user preferred physical properties to calculate a preferred route.

25. The storage medium of claim 20, wherein calculating the route comprises evaluating each possible route based on the three-dimensional environmental model data and one or more conditions or criteria to determine a preferred route.

26. The method of claim 1, wherein receiving the one or more user preferred physical properties comprises receiving a first property and a second property, and wherein assigning the value to each of the one or more road segments comprises:
   generating a first value for a first road segment based on whether the one or more physical properties of the first road segment meet the first property;
   generating a second value for the first road segment based on whether the one or more physical properties of the first road segment meet the second property; and
   combining the first value and the second value to generate the value that is assigned to the first road segment.

27. The method of claim 26, wherein the one or more physical properties of the first road segment meet the first property and the second property, and the first value is different than the second value.

* * * * *